United States Patent [19]

Hunold et al.

[11] 4,351,858

[45] Sep. 28, 1982

[54] PROCESS FOR THE MANUFACTURE OF SUBSTANTIALLY PORE-FREE SHAPED POLYCRYSTALLINE ARTICLES BY ISOSTATIC HOT-PRESSING

[75] Inventors: Klaus Hunold, Kempten; Klaus Reinmuth, Durach; Alfred Lipp, Bad Worishofen; Johannes Napholcz, Kempten; Peter Arnold, Sulzberg, all of Fed. Rep. of Germany

[73] Assignee: Elektroschmelzwerk kempten GmbH, Munich, Fed. Rep. of Germany

[21] Appl. No.: 238,106

[22] Filed: Feb. 25, 1981

[30] Foreign Application Priority Data

Mar. 11, 1980 [DE] Fed. Rep. of Germany ....... 3009240

[51] Int. Cl.$^3$ ............................................. B05D 3/02
[52] U.S. Cl. ..................... 427/193; 427/190;
427/189; 427/201; 427/202; 427/203; 427/204;
427/205; 427/206; 427/370; 427/376.4;
427/376.6; 427/397.7; 427/397.8; 427/402;
427/407.1; 427/409; 427/416; 427/417;
427/418; 427/419.2; 427/419.7
[58] Field of Search ............... 427/228, 189, 190, 193,
427/201-206, 370, 397.7, 397.8, 376.2, 416, 409,
407.1, 417, 419.2, 419.7, 418, 402, 376.4, 376.6

[56] References Cited

U.S. PATENT DOCUMENTS

| | | | |
|---|---|---|---|
| 3,189,477 | 6/1965 | Shaffer | 427/228 |
| 3,393,090 | 7/1968 | Barraco | 427/370 |
| 3,911,188 | 10/1975 | Torti et al. | 427/201 |
| 4,112,143 | 9/1978 | Adlerborn et al. | 427/370 |

FOREIGN PATENT DOCUMENTS

| | | |
|---|---|---|
| 1374033 | 11/1974 | United Kingdom . |
| 1441330 | 6/1976 | United Kingdom . |
| 1522705 | 8/1978 | United Kingdom . |
| 1529966 | 10/1978 | United Kingdom . |

*Primary Examiner*—Michael R. Lusignan
*Assistant Examiner*—Janyce A. Bell
*Attorney, Agent, or Firm*—Burgess, Ryan and Wayne

[57] ABSTRACT

The invention is a process for the manufacture of substantially pore-free shaped articles from polycrystalline material, such as tungsten carbide, silicon nitride, titanium boride or silicon carbide, in which encased articles preformed from pulverulent materials and having open pores are isostatically hot-pressed in a vacuum-sealed casing of vitreous or ceramic-like material in a high-pressure autoclave using an inert gas as pressure-transfer medium. Before the application of the casing material, a first layer comprising material that can be decomposed or melted, such as an organic wax or a resin-like product, or of a compressible heat-resistant material such as inorganic fibers or felts, is applied to the preformed articles. Then, the encased articles are thermally treated until the glass or ceramic layer is fused or sintered gas-tight. The articles pretreated in this manner are then isostatically hot-pressed.

12 Claims, No Drawings

PROCESS FOR THE MANUFACTURE OF SUBSTANTIALLY PORE-FREE SHAPED POLYCRYSTALLINE ARTICLES BY ISOSTATIC HOT-PRESSING

The invention relates to a process for the manufacture of substantially pore-free shaped articles of polycrystalline material, in which articles preformed from pulverulent materials and having open pores are isostatically hot-pressed in a vacuum-sealed casing consisting of a vitreous or ceramic-like material in a high-pressure autoclave using an inert gas as a pressure-transfer medium.

It is known that preformed articles of pulverulent materials can be highly densified or post-densified by isostatic hot-pressing to produce substantially porefree shaped polycrystalline articles having a density which may reach 100% of the theoretical density.

If preformed articles having open porosity, that is to say, having pores open to the surface, are subjected to the isostatic hot-pressing operation, it is necessary to provide them with a gas-tight casing to prevent the gas used as pressure-transfer medium from penetrating into the open pores of the articles and interfering with the densification.

In choosing a suitable casing material, high ductility at the pressing temperature and good compatibility with the material of the preformed article are of decisive importance.

These requirements are met, for example, by casings consisting of metal, which have long been known for this purpose. However, since metal casings can be economically prefabricated only in geometrically simple shapes, and since the unavoidable welding of the casing to the article which occurs during the pressing operation necessitates an expensive post-treatment of the end product, the so-called glass-capsule technique was developed. In this process, prefabricated glass capsules that do not fit exactly the dimensions of the preformed article may be used (see DE-AS No. 23 46 499, which corresponds to GB-PS No. 1 441 330, and DE-OS No. 25 48 740, which corresponds to GB-PS No. 1 522 705), with the space between the glass capsule and the preformed article being filled with a glass powder having a higher softening temperature than that of the capsule itself (see DE-AS No. 26 01 294, which corresponds to GB-PS No. 1 529 966). Before being introduced into the isostatic hot-press, the capsules and their contents are evacuated and then sealed gas-tight. During the heating-up operation in the high-pressure autoclave, the glass capsules and the optionally present glass powder soften and conform to the dimensions of the preformed article, but, particularly with intricately shaped articles; this leads to an unevenly thick casing, which results in uneven densification of the article. Furthermore, the glass material may be pressed into the surface pores of the articles, thus impairing the quality of the surface of the shaped articles.

Instead of being introduced into prefabricated glass capsules, the preformed articles may be coated directly with a glass or vitreous composition, for example by flame or plasma spraying or by immersion, to form a porous surface layer which then, by heating under reduced pressure, is fused to form a gas-tight casing (see DE-AS No. 22 08 250, which corresponds to GB-PS No. 1 374 033), it being possible to apply pressure just when the surface layer is in a highly viscous state. Although a relatively thin casing of uniform thickness can thus be produced, in preformed articles requiring a high densification temperature, this casing must consist of a high-melting vitreous composition in order to prevent the casing from running off prematurely or from penetrating into the article. This, however, has the disadvantage that the surface layer becomes gas-tight only at a rather high temperature.

For preformed articles requiring a high densification temperature, for example those consisting of silicon nitride, a process has therefore become known in which two porous layers are applied to the preformed article, wherein the inner layer applied directly to the article, consists of a high-melting glass-forming material or of metal and the outer layer consists of a low-melting glass-forming material. By heating under reduced pressure, first the outer layer is fused gas-tight, followed immediately by the application of pressure with increasing temperature, so that before reaching and while maintaining the necessary densification temperature, the article is always enclosed by a gas-tight casing (see DE-OS No. 27 02 073, which corresponds to U.S. Pat. No. 4,112,143).

In all cases in which the casing material has been applied directly to the preformed articles, however, the casing material may crack during heating because of the differing thermal expansion coefficients of the preformed article and of the casing material, if this material is not yet plastically deformable or if it has been applied in the form of a suspension which contracts as the temperature is increased. Cracks of this type usually cannot be repaired during the gas-tight fusing or sintering of the casing layer and this results in a high proportion of defective casings and thus in a high reject rate.

The object of the invention is, therefore, to provide a process for the manufacture of substantially pore-free shaped polycrystalline articles from preformed articles having open pores, in a vacuum-tight fused casing of vitreous material by means of isostatic hot-pressing in a high-pressure autoclave using an inert gas as a pressure-transfer medium, in which, during heating, no cracking of the casing layer can occur if the preformed article has a higher coefficient of thermal expansion than that of the casing layer or if the casing layer contracts as the temperature is increased.

This object is achieved, according to the invention, by applying to the preformed articles, a first layer of an organic material that can be decomposed or melted at temperatures of up to about 400° C. under normal pressure, or of a heat-resistant material that is compressible to at least half its volume, and by applying a second layer thereto consisting of a vitreous or ceramic-like material, subsequently thermally treating the encased articles until the second layer is fused or sintered to form the vacuum-tight casing and subsequently isostatically hot-pressing the articles pretreated in this manner until substantially pore-free shaped polycrystalline articles are formed.

Accordingly, in the process according to the invention, the actual casing material, that is to say, the second or outer layer consisting of a vitreous or ceramic-like material, is not applied directly to the preformed article, but between these two there is the first or inner layer consisting either of the organic material, which is melted or decomposed thus forming a cavity when the second layer is fused or sintered gas-tight by the thermal treatment, or of the compressible material, so that the preformed article can expand during heating because of the cavity formed by the first layer or because of the compressibility of that layer, without destroying the second or outer layer, if that is not yet plastically deformable.

In the process according to the invention, preformed articles having pores still open to the surface are used. These articles may be manufactured by moulding from pulverulent materials of any desired type and composition, such as metals, metallic and non-metallic mechanically resistant materials, for example borides, carbides, nitrides, and/or silicides, optionally together with known binder metals and/or sintering aids. The moulding can be carried out by conventional methods, for example by die pressing, isostatic pressing, injection moulding, extrusion moulding or slip casting at room temperature, or by pressureless sintering or simple hot-pressing at elevated temperature. After moulding, the articles should have a density of at least 50%, preferably at least 60%, of the theoretical density so that they are sufficiently stable for the subsequent treatment.

For carrying out the process according to the invention, a first layer consisting either of an organic material that, according to the definition, can be decomposed or melted at temperatures of up to about 400° C. under normal pressure, or of a heat-resistant material that, according to the definition, is compressible to at least half its volume, is applied to the preformed articles. It is not absolutely necessary that the organic material used decomposes or melts completely in the specified temperature range. The only requirement is that a cavity is formed when the second layer is fused or sintered gas-tight, a carbon-containing residue of up to about 20% by weight from the first layer generally being tolerable. Obviously, a requirement in this connection is that such a carbon-containing residue does not react with the material of the preformed article during the isostatic hot-pressing. Materials that can be used for the first layer are, for example, organic waxes or wax-like products and organic resins or resin-like products of natural or synthetic origin.

Examples of these are vegetable waxes such as candelilla wax and carnauba wax; fossil waxes such as montan wax; animal waxes such as beeswax and shellac wax, spermaceti and lanolin; mineral waxes such as ceresin, ozocerite and paraffin wax; chemically modified waxes and synthetic waxes such as, especially, paraffins and hard waxes produced from them; chemical compounds or mixtures of these compounds having a wax-like consistency at room temperature which are usually prepared from waxes or obtained synthetically, such as especially, saturated aliphatic carboxylic acids having from 12 to 30 carbon atoms, preferably from 14 to 22 carbon atoms; for example myristic, pentadecanoic, palmitic, margaric, stearic, nonadecanoic, arachidic and behenic acids, esters and amides thereof; also wax alcohols and fatty amines; vegetable resins such as conifer and elemi resins; resin acids, such as diterpene derivatives, for example abietic and laevopimaric acid or resin acid mixtures; natural resins modified by chemical reactions, and thermoplastic materials which are optionally modified by natural substances (fats, oils or natural resins) such as modified natural substances, for example, cellulose esters or purely synthetic products such as polycondensates, for example, polycarbonates and polyphenylene oxide; polymers, for example polyolefins, polyacetates, polyacrylates and, especially, polymeric fluorohydrocarbons such as polytetrafluoroethylene and polytrifluorochloroethylene; also polyadducts, for example linear polyurethanes.

Instead of the organic material, however, a heat-resistant material that, according to the definition, is compressible to at least half its volume, may be applied as the first layer. By this is understood are inorganic, heat-resistant fibers, non-woven materials or felts.

Examples of these are asbestos fibers or asbestos wool; polycrystalline oxide fibers consisting of zirconium oxide, beryllium oxide, magnesium oxide and, especially, aluminium oxide; polycrystalline fibers consisting of boron, boron carbide, titanium boride or silicon carbide and, especially, polycrystalline fibers consisting of carbon, graphite or boron nitride, which, because of their stability up to 2500° C., are particularly preferred if the preformed articles, for example consisting of titanium boride, silicon nitride or silicon carbide, require a high densification temperature. Instead of the polycrystalline fibers, single-crystal fibers, so-called whiskers, can obviously also be used, but, for economic reasons, these come into consideration less often.

The application of the first layer can be carried out by conventional methods, If, for example, an organic material is used, it can be applied to the molten state, as a solution in an organic solvent, or in aerosol form, by immersion, spraying, brushing, syringeing or painting and then dried. In the case of heat-resistant fibrous or felt material, the preformed articles are suitably wrapped or embedded in it, it being advantageous subsequently, to apply a thin waterproof film of about 1 to 10 μm thickness, for example, of a resin-like product.

The choice of material for the first layer is not dependent on the material of which the preformed article consists. Obviously, however, when using heat-resistant fibrous or felt material, the required compressibility at the densification temperatures used in each case during the isostatic hot-pressing must be ensured.

The thickness of the layer is dependent on the dimensions of the preformed articles and also on the difference between the change in volume of the preformed article and that of the second or actual casing material, caused by their differing thermal expansion or by the contraction of the casing material as a result of the increase in temperature. The larger the preformed articles are and the greeater the difference in the change in volume is, the greater must be the thickness chosen for the first layer. In general, satisfactory results are obtained with layer thickness in the range of about from 0.1 to 3 mm, preferably about from 0.3 to 1 mm, for the organic material, and in the range of about from 0.5 to 10 mm, preferably about from 2 to 6 mm, for the fibrous or felt material.

After the first layer has been applied and dried, the actual casing material, in the form of a second or outer layer comprising a vitreous or ceramic-like material, is then applied. By this is meant materials comprising glass, glass ceramics, sintered glass ceramics and oxide ceramics, which may be used as suspensions of a mixture of the materials themselves and/or of the raw materials.

A requirement of the material chosen for the second layer is that the casing material or its constituents do not react with the material of the preformed article when in direct contact with it, and that the casing must be plastically deformable at the densification temperature used during the isostatic hot-pressing.

Examples of glass materials are low-melting borosilicate glasses and aluminosilicate glasses, high-melting so-called Vycor glasses (about 96% $SiO_2$ and 3% $B_2O_3$) and pure silica glass, all of which are advantageously applied in the form of an aqueous glass powder suspension together with an organic binder such as polyvinyl alcohol or stearic acid, by conventional methods, such as immersion, spraying, syringeing, brushing or painting.

Ceramic oxide materials, on the other hand, are advantageously applied by the same methods as ceramic pastes consisting of oxides, such as $Al_2O_3$, $SiO_2$, MgO, $ZrO_2$ and/or CaO, especially in the form of suspensions of a mixture rendered viscous (slips), wherein sodium carbonate and/or sodium silicate have optionally been added for the liquefaction of the paste, optionally together with an organic binder. The ceramic pastes should, however, have a melting proportion of at least 4% by weight, preferably about 10% by weight, that melts at the densification temperature during the isostatic hot-pressing and this can be achieved, for example, by adding glass-forming raw materials, such as feldspars in combination with $SiO_2$. In the dense-sintering of such compositions, allowance should be made for a reduction in volume, which, however, should not exceed about 20%. Under these conditions, densification temperatures of up to 2000° C., as are required, for example, for the densification of preformed articles consisting of silicon carbide, may be attained during the isostatic hot-pressing.

After the application of the second layer of the vitreous or ceramic-like material, the preformed articles are dried again, for example, by slow heating to about 120° C. After drying, the thickness of the second layer is generally about from 0.1 to 3 mm, preferably about from 0.5 to 0.8 mm.

The encased articles are then subjected to a thermal treatment, which, when an organic material is used for the first layer, is advantageously carried out in two stages. The articles are heated under normal pressure first to temperatures of about 400° C., the first layer melting or decomposing to form a cavity between the article and the second layer. Then, under reduced pressure (about $10^{-1}$ mbar), the article is further heated until the second layer is fused or sintered gas-tight. If a heat-resistant material is used for the first layer, the thermal treatment may be carried out in one stage, that is, the encased articles are heated directly under reduced pressure, without pre-heating, until the second layer is fused or sintered gas-tight.

Finally, the articles pretreated in this manner are heated in the high-pressure autoclave to the required densification temperature of the articles while slowly increasing the pressure to about 1500 to 3000 bar, preferably using argon or nitrogen as inert gases for the pressure transfer.

In principle, it is possible to carry out the thermal treatment and the hot isostatic densification in the high-pressure autoclave itself. The thermal treatment may be carried out, however, in another furnace, for example in a batch furnace or a continuously operated tunnel furnace. In that case, it is necessary to ensure, by means of slow cooling of the encased articles, that the casings do not develop cracks during the transfer of the articles to the high-pressure autoclave. For this reason, it is advantageous to carry out only the optionally required first stage of the thermal treatment in another furnace, so that the high-pressure autoclave is not contaminated by decomposition residues from the first layer. The complete densification of the encased articles at the required temperature under the specified pressure is generally achieved after about from 1 to 2 hours. Then the pressure and temperature are slowly reduced, and the cooled articles are removed from the autoclave and released from the casing by simply knocking or sandblasting the casing away. A more expensive post-treatment, even of intricately shaped articles, is generally not required.

By means of the process according to the invention, it is thus possible, for the first time, to subject to the hot isostatic pressing operation, even intricate preformed articles having open porosity and consisting of pulverulent materials which require high densification temperatures such as those consisting of silicon nitride, titanium boride and especially silicon carbide, without the necessary un-prefabricated casing material consisting of vitreous or ceramic-like materials and satisfying the requirements of plastic deformability in this temperature range, being prematurely destroyed, during the heating-up operation, before it is plastically deformable, as a result of irreparable cracks caused by the differences in the changes in volume occurring. Thus, during heating-up in the isostatic hot-pressing operation, the articles are effectively protected against the undesired penetration of the pressure-transfer gas into the still open pores.

The process according to the invention is, however, similarly suitable for the densification of preformed articles of pulverulent materials which require less high temperatures for complete densification such as those consisting of tungsten carbide and cobalt as a binder metal, wherein a glass or vitreous substance, which is plastically deformable in that temperature range, is chosen as casing material.

The process according to the invention can thus be used universally, irrespective of the material of which the preformed article consists.

In the following examples, the process according to the invention, is explained in detail. Herein, $\alpha$ signifies the linear coefficient of thermal expansion and TD signifies the theoretical density.

EXAMPLE 1

(a) Cube-shaped articles having sides 20 mm long (density: 10.5 g/cm$^3$=72.51% TD; $\alpha \approx 5.5 \times 10^{-6}$/K) were produced from pulverulent tungsten carbide, with 6% by weight of cobalt as binder metal, by die pressing in a hard metal mould.

(b) Polytetrafluoroethylene was applied in aerosol form by spraying, as the first layer, to a cube manufactured according to (a), and dried. After drying, the layer was 0.3 mm thick. As the second layer, an aqueous suspension of a glass powder consisting of 65% by weight of $SiO_2$, 20% by weight of $Al_2O_3$, 5% by weight of $B_2O_3$, 6% by weight of CaO and 4% by weight of MgO ($\alpha \approx 3 \times 10^{-6}$/K) with 3% by weight of polyvinyl alcohol as organic binder, was applied by immersion and dried. After drying, this second layer was 0.7 mm thick.

The encased cube was then heated, in a tube furnace, to 400° C. under normal pressure, during which, the first layer decomposed. The encased cube was then placed in a high-pressure autoclave and heated under reduced pressure ($10^{-1}$ mbar) for 15 minutes to 950° C. in order to fuse and seal the glass powder layer. The pressure was then slowly increased and the cube was densified by isostatic hot-pressing for 1 hour at 1360° C. and 1000 bar argon pressure.

The final density of the encased cube was 14.45 g/cm$^3$, that is, approximately 100% TD.

(c) A 2 mm thick graphite felt was stuck, as the first layer, onto a cube manufactured according to (a) and a thin water-insoluble film about 5 μm thick was applied thereto by spraying on polytetrafluoroethylene is aerosol form.

Then, as described under (b), a second layer consisting of glass powder was applied and dried (layer thickness 0.7 mm). The encased cube was then placed, without pre-heating, in a high-pressure autoclave and, as described under (b), the casing was fused vacuum-tight and the cube was densified by isostatic hot-pressing.

The final density of the encased cube was 14.48 g/cm$^3$, that is, 100% TD.

EXAMPLE 2

(a) Discs of 70 mm diameter and 20 mm thickness (density: 4.16 g/cm$^3$=92.43% TD; $\alpha \approx 7.0 \times 10^{-6}$/K) were manufactured from pulverulent titanium diboride by simple hot-pressing.

(b) A first layer 1.0 mm thick was applied by immersion in melted paraffin wax, to a disc manufactured according to (a). As the second layer, an aqueous slurry of silica glass powder ($\alpha \approx 1 \times 10^{-6}$/K), with 3% by weight of stearic acid as organic binder, was applied by immersion and dried. After drying, this second layer was 0.5 mm thick.

The encased disc was then heated in a tube furnace to 200° C. under normal pressure, during which the first layer melted. The encased disc was then placed in a high-pressure autoclave and heated under reduced pressure ($10^{-1}$ mbar) for 15 minutes to 1600° C. in order to fuse and seal the silica glass casing. The pressure was then slowly increased and the disc was densified by isostatic hot-pressing for 1 hour at 1750° C. and 2000 bar argon pressure.

The final density of the encased disc was 4.46 g/cm$^3$=99.1% TD.

(c) A 4 mm thick aluminium oxide felt was stuck, as the first layer, onto a disc manufactured according to (a), and a thin, water-insoluble film about 5 μm thick was applied thereto by spraying on polytetrafluoroethylene in aerosol form.

Then, as described under (b), a second layer consisting of silica glass powder was applied and dried (layer thickness 0.5 mm). The encased disc was then placed, without pre-heating, in a high-pressure autoclave and, as described under (b), the casing was fused vacuum-tight and the disc was densified by isostatic hot-pressing.

The final density of the encased disc was 4.48 g/cm$^3$=99.3% TD.

EXAMPLE 3

(a) Cylinders of 30 mm diameter and 50 mm height (density: 1.98 g/cm$^3$=61.68% TD; $\alpha \approx 5 \times 10^{-6}$/K) were manufactured from pulverulent α-silicon carbide and 0.4% by weight of aluminium powder as a sintering aid by isostatic pressing at room temperature.

(b) A first layer consisting of stearic acid dissolved in acetone was applied, by immersion, to a cylinder manufactured according to (a), and dried. After drying, the layer was 1.0 mm thick. As a second layer, a ceramic slip consisting of 95.0% by weight of Al$_2$O$_3$, 4.0% by weight of SiO$_2$, 0.3% by weight of MgO and 0.7% by weight of alkali metals and alkaline earth metals was applied by painting ($\alpha \approx 5 \times 10^{-6}$/K; contraction of approximately 2% during sintering to be allowed for) and dried. After drying, this second layer was 0.8 mm thick.

The encased cylinder was then heated in a tube furnace to 300° C. under normal pressure, during which the first layer was melted.

The encased cylinder was then placed in a high-pressure autoclave and heated under reduced pressure ($10^{-1}$ mbar) for 15 minutes to 1650° C. in order to sinter and seal the ceramic layer. The pressure was then slowly increased and the cylinder was densified by isostatic hot-pressing for two hours at 1900° C. and 2000 bar argon pressure.

The final density of the encased cylinder was 3.19 g/cm$^3$=99.4% TD.

(c) A 6 mm thick graphite felt was stuck, as the first layer, onto a cylinder manufactured according to (a) and a thin, water-insoluble film about 5 μm thick was applied thereto by spraying on polytetrafluoroethylene in aerosol form.

Then, as described under (b), a ceramic slip was applied, as the second layer, and dried (layer thickness 0.8 mm). The encased cylinder was then placed, without pre-heating, in a high-pressure autoclave and, as described under (b), the casing was sintered vacuum-tight and the cylinder was densified by isostatic hot-pressing.

The final density of the encased cylinder was 3.21 g/cm$^3$=100% TD.

What is claimed is:

1. In a process for the manufacture of substantially pore-free shaped polycrystalline articles from heat-resistant articles having open pores in a vacuum-sealed casing of vitreous material by means of isostatic hot-pressing in a high pressure autoclave using an inert gas as pressure-transfer medium, the improvement which comprises applying a first layer comprising a material selected from the group consisting of organic materials that can be decomposed or melted at temperatures of up to about 400° C. under normal pressure, heat-resistant materials that are compressible to at least half their volume, or combinations thereof to the heat-resistant articles; applying a second layer comprising a vitreous or ceramic-like material over said first layer to form an encased article; thermally treating the encased article until the second layer is fused or sintered to form the vacuum sealed casing; and isostatically hot-pressing the vacuum sealed encased article until a substantially pore-free shaped polycrystalline article is formed.

2. A process according to claim 1, wherein an organic wax or wax-like product of natural or synthetic origin is used for the first layer.

3. A process according to claim 1, wherein an organic resin or resin-like product of natural or synthetic origin is used for the first layer.

4. A process according to claim 1, wherein the first layer comprises inorganic, heat-resistant fibers.

5. A process according to claim 1 or 4, wherein asbestos fibers or asbestos wool is used for the first layer.

6. A process according to claims 1 or 4, wherein polycrystalline fibers selected from the group consisting of aluminium oxide, carbon, graphite or boron nitride are used for the first layer.

7. A process according to claim 1, wherein a suspension of glass powder or glass-forming raw materials is used for the second layer.

8. A process according to claim 1, wherein a viscous suspension of a mixture comprising ceramic oxides and at least 4% by weight of glass-forming raw materials is used for the second layer.

9. A process according to claim 1, wherein the encased articles are subjected to a first thermal treatment, at temperatures up to 400° C. under normal pressure and then to a second thermal treatment at a temperature at least as high as the fusing or sintering temperature of the vitreous or ceramic-like second layer under reduced pressure.

10. A process of claim 1 wherein the first layer comprises a material selected from the group consisting of polytetrafluoroethylene, graphite felt, paraffin wax, aluminum oxide felt, stearic acid and mixtures thereof.

11. The process of claim 1 wherein the second layer comprises a material selected from the group consisting of glas powder, a ceramic slip and mixtures thereof.

12. A process of claim 1 wherein the first layer comprises a material selected from the group consisting of polytetrafluoroethylene, graphite felt, paraffin wax, aluminum oxide felt, stearic acid and mixtures thereof and the second layer comprises a material selected from the group consisting of glass powder, ceramic slip and mixtures thereof.

* * * * *

UNITED STATES PATENT AND TRADEMARK OFFICE
CERTIFICATE OF CORRECTION

PATENT NO. : 4,351,858
DATED : September 28, 1982
INVENTOR(S) : Klaus Hunold, et al It is certified that error appears in the above—identified patent and that said Letters Patent is hereby corrected as shown below:

Column 4, line 24: delete "to" and insert --in--.
          line 45: delete "greeater" and insert --greater--.
Column 6, line 68: delete "1000" and insert --100--.
Column 7, line 6: delete "is" and insert --in--.
          line 49: after "under", line 50 should continue.
Column 8, line 57 (Claim 4): After "heat-resistant fibers" there should be inserted --, woven materials comprised of heat-resistant fibers or felts comprised of heat-resistant fibers--.
Column 10, line 5, (Claim 11): delete "glas" and insert --glass--.

Signed and Sealed this

Twenty-second Day of May 1984

[SEAL]

Attest:

GERALD J. MOSSINGHOFF

Attesting Officer

Commissioner of Patents and Trademarks